Figure 1:
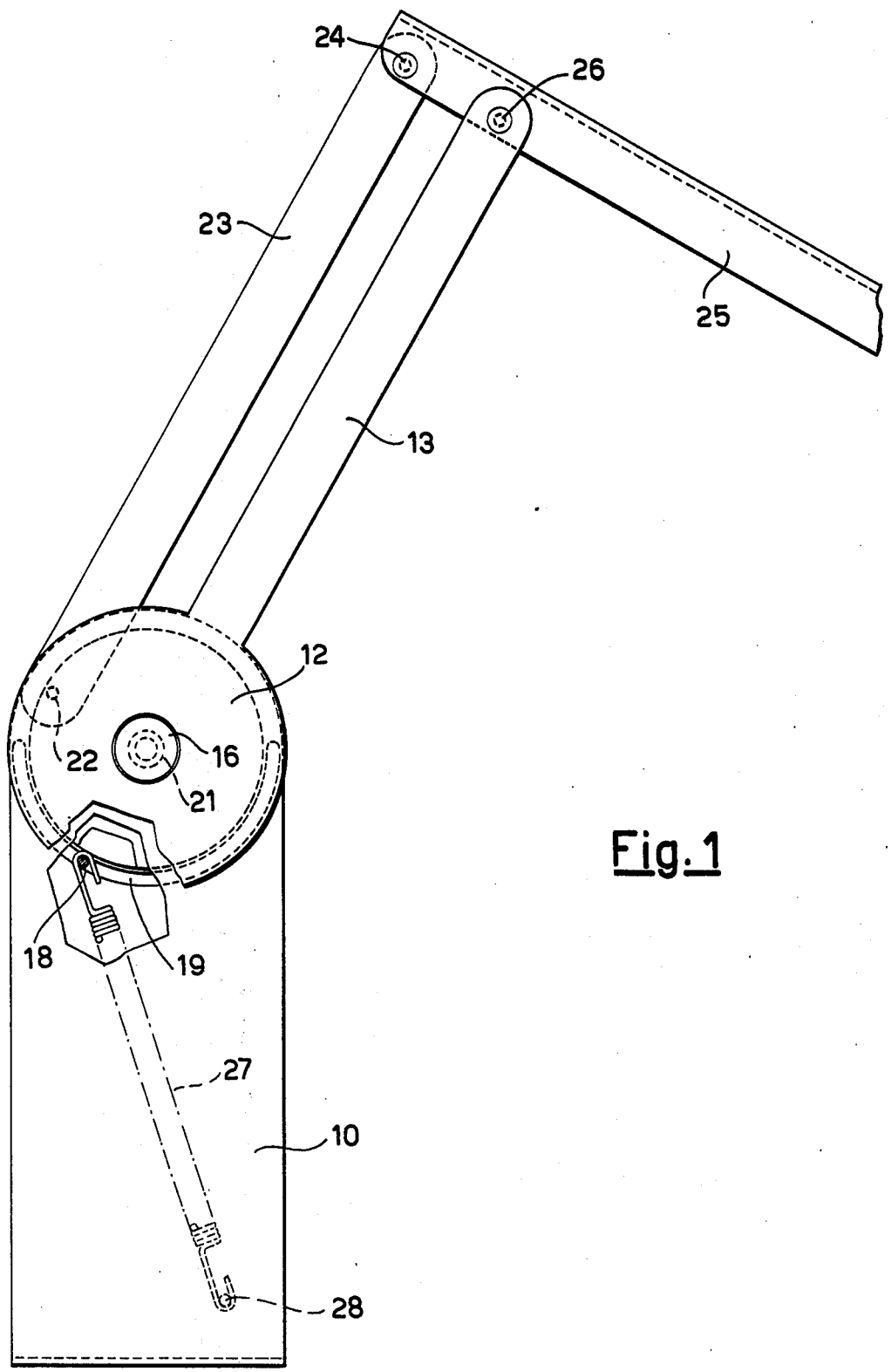

United States Patent [19]

Sowden

[11] 4,165,530

[45] Aug. 21, 1979

[54] ARTICULATED-ARM SUPPORTING MEMBER, ESPECIALLY FOR LAMPS

[75] Inventor: George J. Sowden, Milan, Italy

[73] Assignee: I Guzzini S.P.A., Recanati, Italy

[21] Appl. No.: 927,897

[22] Filed: Jul. 25, 1978

[30] Foreign Application Priority Data

Jul. 28, 1977 [IT] Italy ............................. 26262 A/77

[51] Int. Cl.² .......................................... F21V 21/26
[52] U.S. Cl. .............................. 362/401; 248/280.1;
248/281.1; 248/585; 362/402; 362/413;
362/418; 362/427
[58] Field of Search .................... 74/531, 96; 362/413,
362/418, 422, 424, 425, 427, 428, 269, 270, 285,
287; 248/123, 280.1, 281.1, 585, 586, 587

[56] References Cited

U.S. PATENT DOCUMENTS

| | | | |
|---|---|---|---|
| 1,310,558 | 7/1919 | Dohy | 74/96 |
| 2,301,661 | 11/1942 | Wiedenhoeft | 362/428 |
| 2,498,375 | 2/1950 | Moore | 74/531 |
| 2,533,963 | 12/1950 | Sacchini | 74/96 |
| 2,570,778 | 10/1951 | De Vane | 362/428 |
| 2,911,525 | 11/1959 | Strom | 362/418 |
| 3,188,460 | 6/1965 | Thorsen et al. | 362/418 |
| 3,253,473 | 5/1966 | Chisholm | 74/96 |
| 3,774,873 | 11/1973 | Krogsrud | 248/586 |
| 4,080,530 | 3/1978 | Krogsrud | 362/427 |

FOREIGN PATENT DOCUMENTS

| | | | |
|---|---|---|---|
| 197918 | 11/1957 | Austria | 248/281.1 |
| 681383 | 10/1966 | Belgium | 362/413 |
| 166346 | 1/1905 | Fed. Rep. of Germany | 362/418 |
| 433052 | 3/1925 | Fed. Rep. of Germany | 362/413 |
| 722512 | 7/1942 | Fed. Rep. of Germany | 74/96 |
| 117122 | 9/1946 | Sweden | 362/427 |
| 559006 | 1/1944 | United Kingdom | 362/427 |
| 618344 | 2/1949 | United Kingdom | 248/281.1 |
| 619370 | 3/1949 | United Kingdom | 362/413 |
| 637550 | 5/1950 | United Kingdom | 362/427 |
| 652549 | 4/1951 | United Kingdom | 362/413 |
| 686483 | 1/1953 | United Kingdom | 362/413 |
| 936898 | 9/1963 | United Kingdom | 248/586 |
| 136609 | 6/1960 | U.S.S.R. | 74/96 |

Primary Examiner—Richard E. Schafer
Assistant Examiner—T. S. Gron
Attorney, Agent, or Firm—Haseltine, Lake & Waters

[57] ABSTRACT

An articulated arm supporting structure for a lamp is disclosed, in which the combination of three arms with a couple of friction discs and a pull spring is such as to permit the entire arm assembly to be desirably positioned while balancing the entire structure by means of resilient and frictional forces.

5 Claims, 4 Drawing Figures

ARTICULATED-ARM SUPPORTING MEMBER, ESPECIALLY FOR LAMPS

Supporting arms for lamps are known, which structurally comprise two articulated quadrilaterals which are pivotally connected together and to a supporting means and are equipped with a spring and frictional engagement member system capable of balancing the weight of the assembly irrespective of the position of the assembly. The lamp can thus be manually displaced without any appreciable force, to the position which is desired by the user.

These supporting members give more than satisfactory results but their construction is expensive due to the comparatively large number of the component parts concerned, both in the formation of the two articulated quadrilaterals and in that of all the pivotal nodes, and also in the spring and frictional-member balancing system.

An object of the present invention is to provide an articulated-arm supporting member of the kind referred to above, particularly but not exclusively for lamps, having such a structure which, while retaining all the advantages over the conventional supporting members, can be fabricated with a minimum number of component parts and thus with a considerably lesser first cost.

To this end, according to the invention, it has been envisaged to provide an articulated-arm supporting member characterized by comprising, in combination: a supporting member proper, a couple of side arms interconnected and coaxially pivoted to said supporting member proper, a third central arm of a connecting rod pivoted to a crank which is rotatable coaxially with the side arms, and a fourth arm pivoted to the free end of the third arm and, in addition, to the free ends of the side arms with which frictional and resilient means are cooperative, the latter being adapted to balance the structure.

Figure 2:
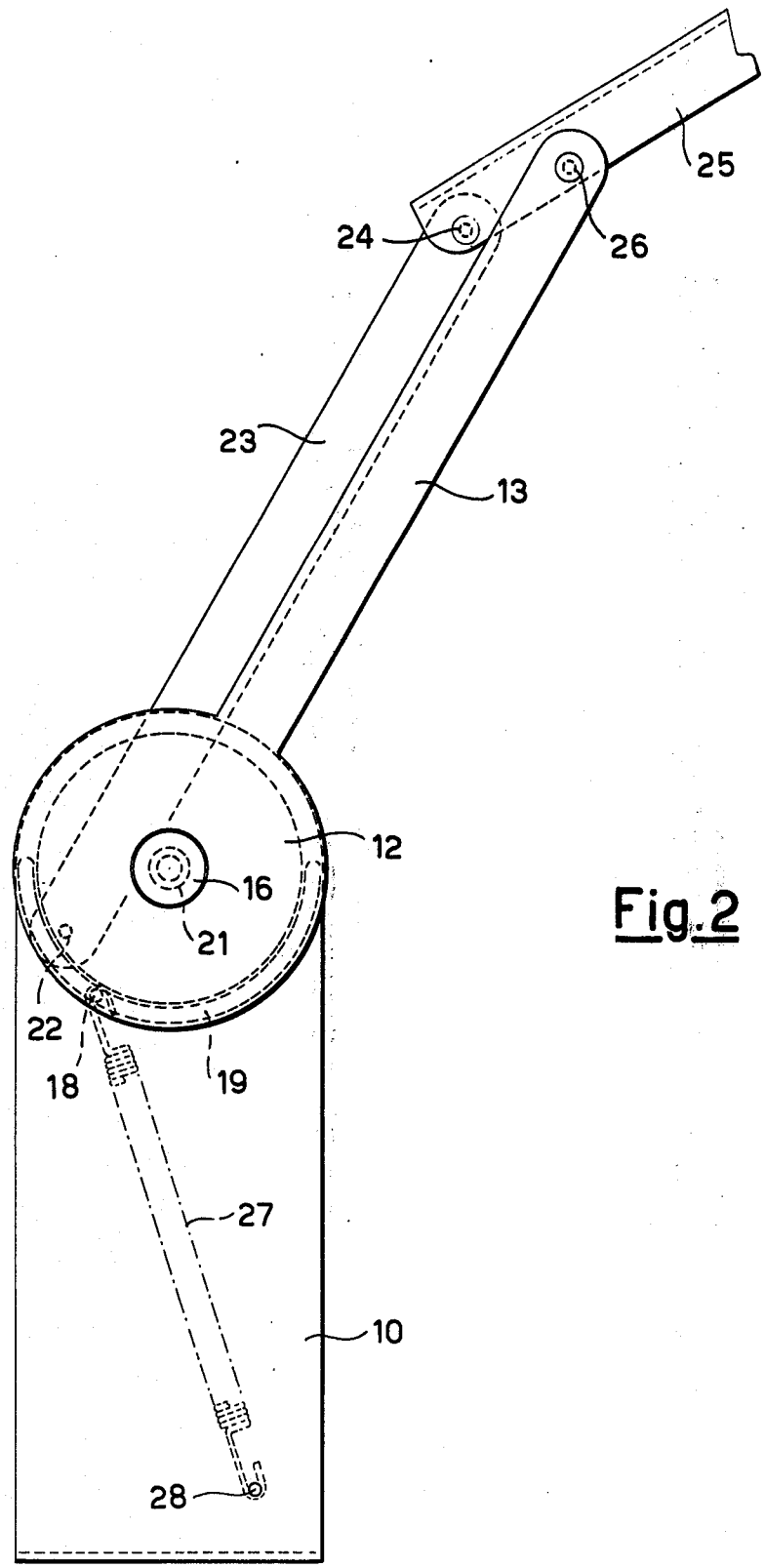
Figure 3:
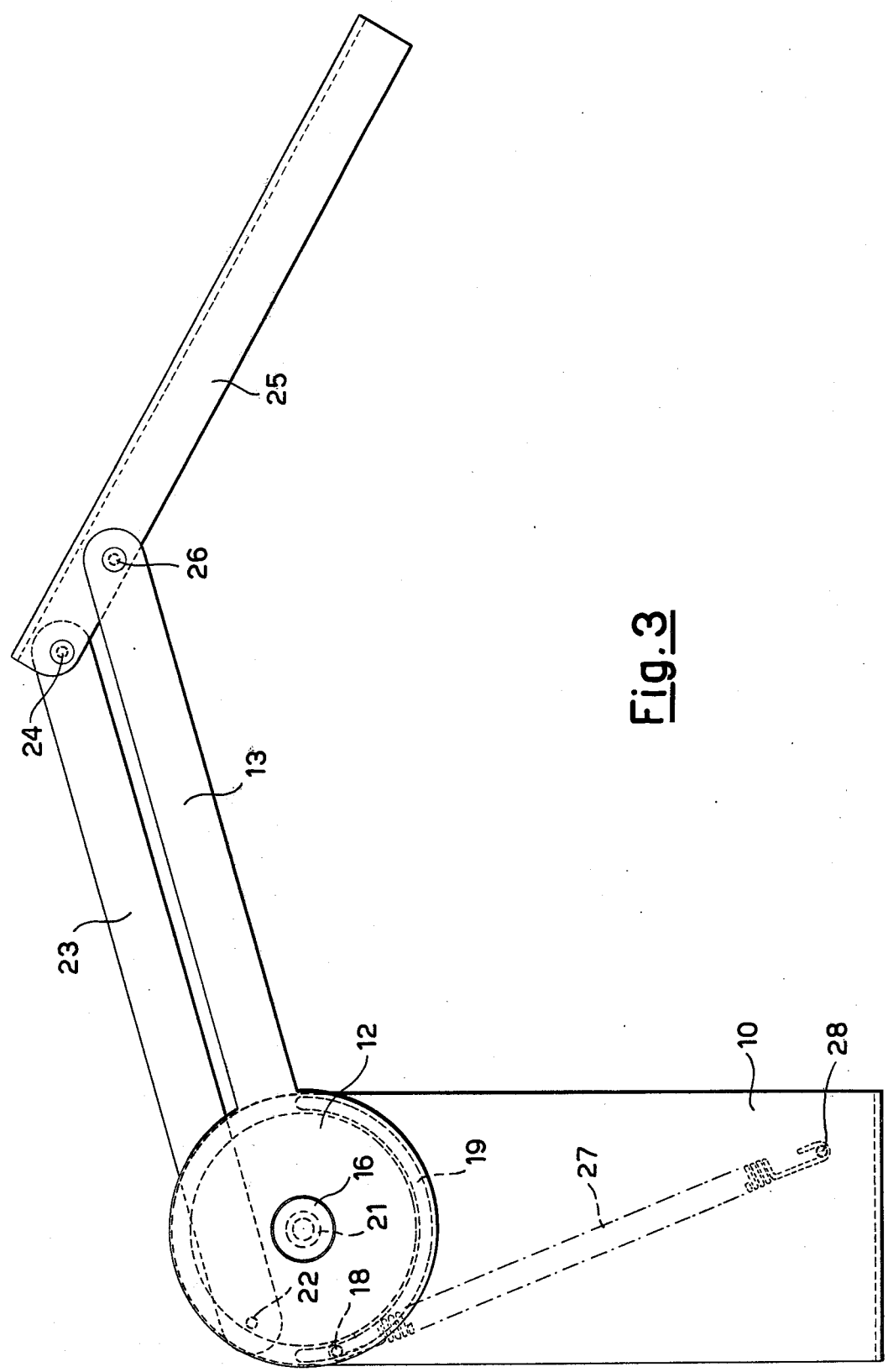
Figure 4:
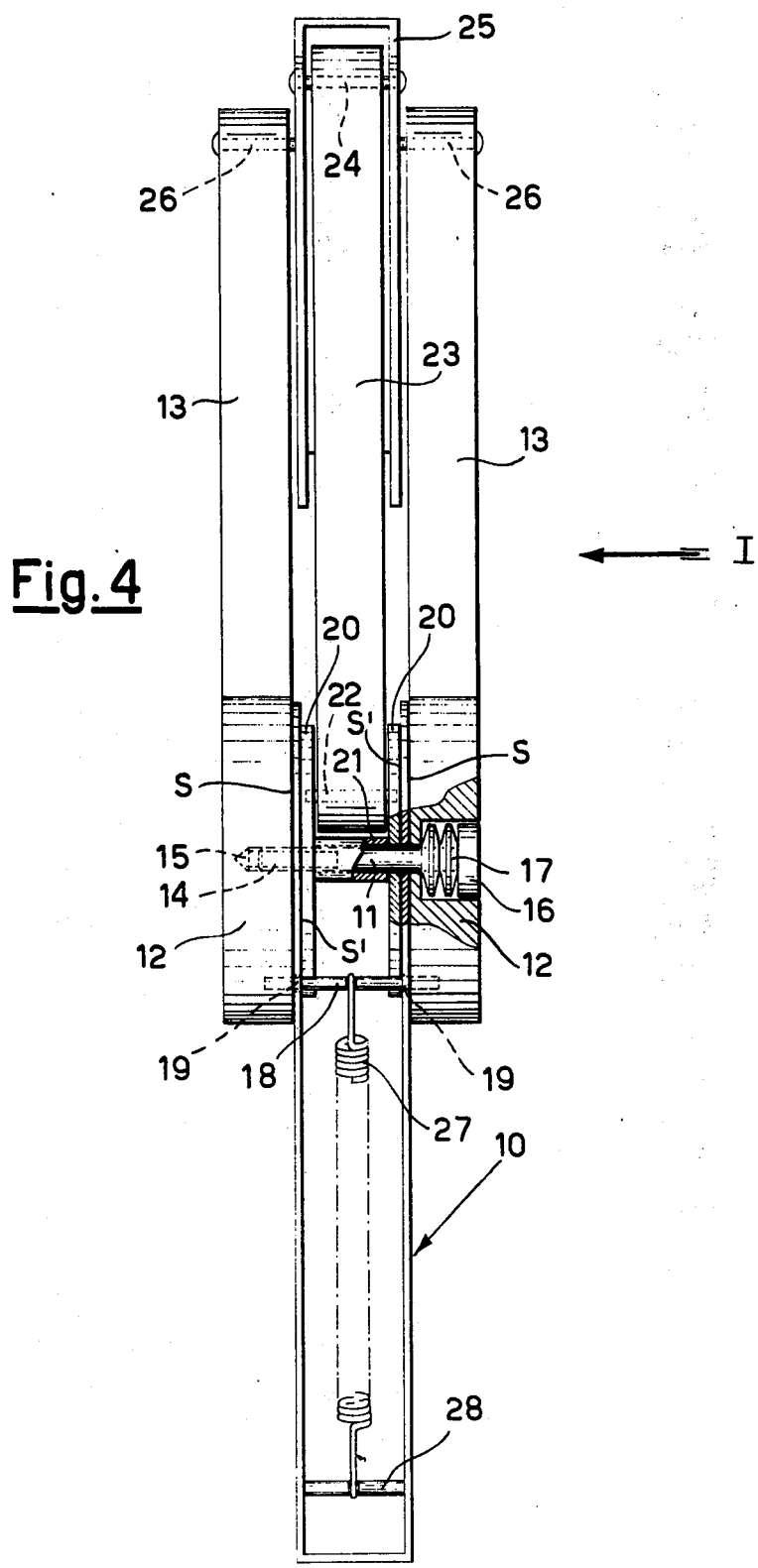

FIGS. 1, 2 and 3 are side elevational views of a supporting member incorporating the principles of this invention in two different working positions, and FIG. 4 is a view taken along the arrow F of FIG. 1, partly in cross-sectional view.

With reference to the drawings, the supporting member in question comprises a supporting section 10, having a generally "U" shaped outline, to which, by the agency of a pin 11, are pivoted the end headers of disclike form, 12, of a couple of side arms 13 which are extended from the U-section.

The pin 11 is partially screw-threaded at 14 at either end so as to be screwably fastened (as viewed in FIG. 4) to the complementary seat 15 of either header piece 12, and has a head 16 at the opposite end, so that its screwing-in, with the insertion of a pack of cup springs 17, permits the controlled pressure of both headers 12 against the U-section 10. Thus, two friction surfaces S are provided for the articulation of the arms 13, which takes place concurrently since the arms are interconnected by a transversal dowel 18 which is moved within a couple of semicircular slots 19 formed through the U-section 10.

To the pin 11, in the interior of the U-section 10, is pivoted, in addition, a couple of discs 20 spaced apart from each other by a bushing 21 and to which is pivoted, through an eccentric pin 22, a third central arm 23 inserted between the side arms 13. Obviously, also in this case, by virtue of the clamping action provided by the pin 11, frictional surfaces are provided, S', for the articulation of the central arm 23.

To the free end of the arm 23, by the intermediary of a pin 24, is pivoted a fourth arm 25, having a U-shaped cross-sectional outline, the webs of which, by the agency of pins 26, are pivoted, in their turn, to the side arms 13.

To the free end of the arm 25 is fastened the member intended to be hung (not shown in order not to overcrowd the drawing), more particularly a lamp, the weight of which is balanced by a spring 27 which is held taut between a pin 28 of the stirrup 10 and the dowel 18 which connects the headers 12 of the arms 13 to one another, and by the functional assembly which is composed by the items 16-17-20 which cause the surfaces S and S' to become active.

FIG. 4 of the drawings clearly shows that the position of the hung article can be varied both by rotating the arms 13 about the pin 11 and rotating the arm 25 about the pins 26, that which obviously causes a rotation, about 11, of the discs 20 due to the action of the arm 23 and the eccentric pin 22.

In practice, the arm 23 and the pin 22 and the discs 20 compose a crank and connecting rod assembly.

During the displacements referred to above, it is apparent that the concurrent action of the frictional surfaces S and S' of the spring 27 permits smooth displacements with the stoppage of the assembly in the stable position as desired.

It has been proposed, thus, a supporting structure with articulated arms with an incorporated balancing system which, as embodied, requires a minimum number of component parts, because of the articulated connection between the several arms and the balancing system with spring and frictional surfaces. This, as is obvious, is a considerable improvement from an economical point of view.

While a specific embodiment of the invention has been shown and described herein, it will be understood that modifications and changes can be introduced therein without departing from the scope of the invention as defined in and by the appended claims.

I claim:

1. An articulated-arm support device for lamps, comprising: a support member having an upper portion formed as a pair of parallel upwardly extending walls; a pair of side arms terminating at one end with disclike heads external with respect to said parallel walls of the supporting member and being coaxially pivoted to said parallel walls through a traverse pin; a central arm having one end eccentrically pivoted to a pair of mutually spaced lateral discs, coaxially and pivotally mounted on said pin internally to said walls of said supporting member; a further arm, pivoted to the other end of said central and side arms; first resilient means being associated with said pin adapted to resiliently force said heads, walls and discs along the axis of said pin and to provide for frictional engagement therebetween; and second resilient means acting between said supporting member and at least one of said pivoted heads to balance the arm assembly.

2. An articulated-arm support device according to claim 1, wherein: said confronting surfaces of said heads, walls, and discs are adapted to provide direct frictional engagement therebetween.

3. An articulated-arm support device according to claim 1, wherein: said discs are mutually spaced apart by a bushing interposed therebetween.

4. An articulated-arm support device according to claim 1, wherein: said first resilient means is formed of compression spring means interposed between an end of said pin and one of said heads, the other end of said pin being rigidly fastened to the other head.

5. An articulated-arm support device according to claim 1, wherein: there is provided a dowel interconnecting said heads and passing through arcuate slots in said walls of the supporting member, and said second resilient means is an extension spring having one end attached to the supporting member and the other end attached to said dowel.

* * * * *